(12) United States Patent
Tomita

(10) Patent No.: US 10,719,330 B2
(45) Date of Patent: Jul. 21, 2020

(54) COMMUNICATION DEVICE, DISPLAY DEVICE, AND CONTROL METHOD FOR DISPLAY DEVICE

(71) Applicant: SEIKO EPSON CORPORATION, Tokyo (JP)

(72) Inventor: Kenichiro Tomita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 139 days.

(21) Appl. No.: 15/777,626

(22) PCT Filed: Nov. 15, 2016

(86) PCT No.: PCT/JP2016/083848
§ 371 (c)(1),
(2) Date: May 18, 2018

(87) PCT Pub. No.: WO2017/090488
PCT Pub. Date: Jun. 1, 2017

(65) Prior Publication Data
US 2018/0329720 A1 Nov. 15, 2018

(30) Foreign Application Priority Data
Nov. 24, 2015 (JP) .................................. 2015-228373

(51) Int. Cl.
| | | |
|---|---|---|
| G06F 9/4401 | (2018.01) | |
| H04L 12/28 | (2006.01) | |
| H04W 52/02 | (2009.01) | |
| G06F 1/3209 | (2019.01) | |
| G06F 1/3234 | (2019.01) | |
| G06F 1/3287 | (2019.01) | |

(52) U.S. Cl.
CPC .......... *G06F 9/4418* (2013.01); *G06F 1/3209* (2013.01); *G06F 1/3265* (2013.01);
(Continued)

(58) Field of Classification Search
CPC ........ G06F 1/32; G06F 1/3203; G06F 1/3206; G06F 1/3209; G06F 1/3218;
(Continued)

(56) References Cited

U.S. PATENT DOCUMENTS

2007/0286630 A1* 12/2007 Watanabe .......... G03G 15/5004
399/88
2009/0135751 A1* 5/2009 Hodges ................. G06F 1/3209
370/311
(Continued)

FOREIGN PATENT DOCUMENTS

JP    2009-294927 A    12/2009
JP    2010-178249 A     8/2010
(Continued)

OTHER PUBLICATIONS

Jan. 24, 2017 International Search Report issued in International Patent Application No. PCT/JP2016/083848.

*Primary Examiner* — Thomas J. Cleary
(74) *Attorney, Agent, or Firm* — Oliff PLC

(57) ABSTRACT

A communication device includes: a communication unit which receives control data; and a main control unit which controls an operation of the communication device, based on the control data received by the communication unit. The communication device operates in a first standby state where the main control unit stops at least a part of operations and where the communication unit detects only an access to a specific port that designates the communication device as a destination, and in a second standby state where the main control unit can execute the operations and controls the operation of the communication device, based on the control data. The communication unit wakes up the main control unit if an access to the specific port is detected in the first standby state.

9 Claims, 9 Drawing Sheets

(52) U.S. Cl.
CPC ............ *G06F 1/3287* (2013.01); *H04L 12/28* (2013.01); *H04L 12/2838* (2013.01); *H04W 52/0274* (2013.01); *H04W 52/027* (2013.01)

(58) Field of Classification Search
CPC .... G06F 1/3228; G06F 1/3243; G06F 1/3265; G06F 1/3287; G06F 9/4418; H04L 12/28; H04L 12/2838; H04W 52/02; H04W 52/0225; H04W 52/0229; H04W 52/0261; H04W 52/027; H04W 52/0274; H04W 52/028

See application file for complete search history.

(56) References Cited

U.S. PATENT DOCUMENTS

| | | | |
|---|---|---|---|
| 2009/0282278 A1 | 11/2009 | Satoh | |
| 2010/0165897 A1* | 7/2010 | Sood | G06F 1/3287 370/311 |
| 2011/0019600 A1* | 1/2011 | Ping | G06F 1/3203 370/311 |
| 2011/0182208 A1 | 7/2011 | Shima et al. | |
| 2013/0179700 A1 | 7/2013 | Toda et al. | |
| 2013/0179708 A1 | 7/2013 | Iwasaki et al. | |
| 2014/0032955 A1* | 1/2014 | Boelter | H04L 47/32 713/323 |
| 2014/0198698 A1* | 7/2014 | Kristiansson | H04W 52/0229 370/311 |
| 2015/0371117 A1* | 12/2015 | Ooba | G06K 15/4055 358/1.15 |
| 2018/0048847 A1* | 2/2018 | Tomita | G03B 21/14 |
| 2018/0252991 A1* | 9/2018 | Tomita | G03B 21/14 |

FOREIGN PATENT DOCUMENTS

| | | |
|---|---|---|
| JP | 2011-154416 A | 8/2011 |
| JP | 2011-154506 A | 8/2011 |
| JP | 2013-141161 A | 7/2013 |
| JP | 2013-164833 A | 8/2013 |
| JP | 2015-153130 A | 8/2015 |

* cited by examiner

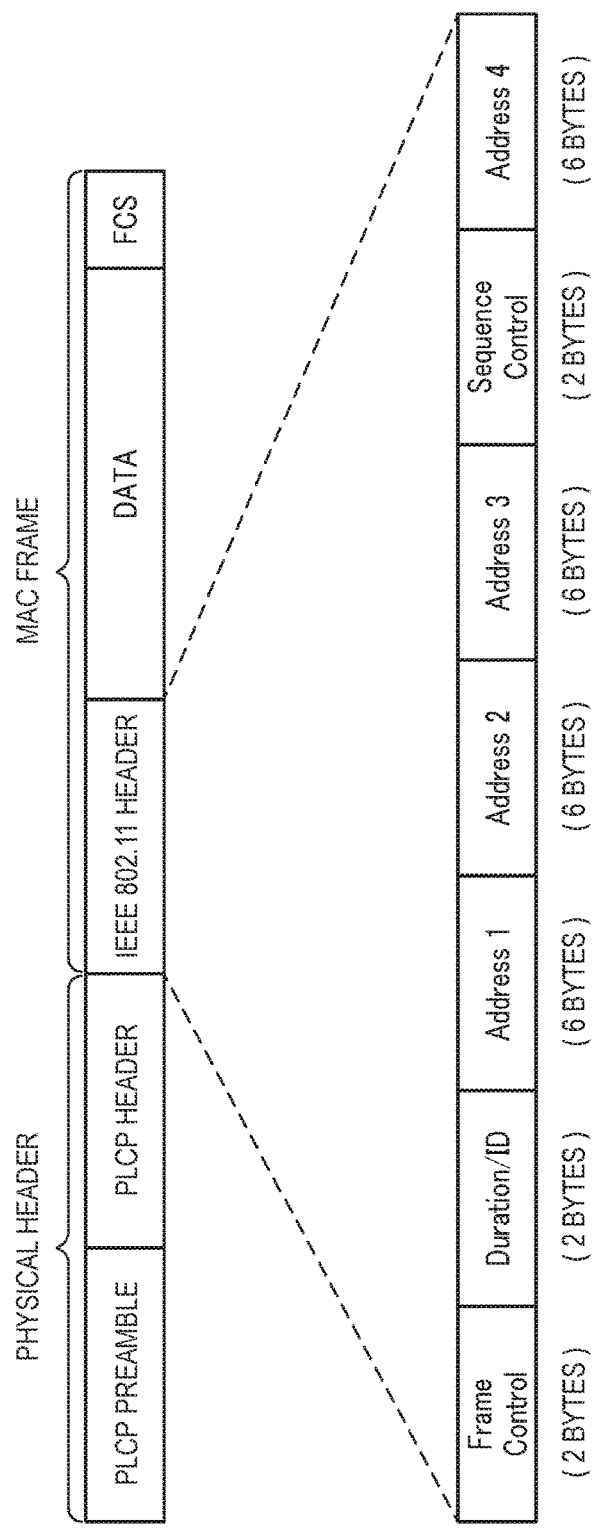

FIG.5A

| 0 | 7 | 8 | 15 | 16 | 23 | 24 | 31 |
|---|---|---|---|---|---|---|---|
| SENDER PORT NUMBER (16 BITS) | | | | DESTINATION PORT NUMBER (16 BITS) | | | |
| MESSAGE LENGTH (16 BITS) | | | | CHECKSUM (16 BITS) | | | |
| DATA | | | | | | | |

| 0 | 7 | 8 | 15 | 16 | 23 | 24 | 31 |
|---|---|---|---|---|---|---|---|
| HARDWARE IDENTIFICATION | | | | PROTOCOL | | | |
| HLEN | | PLEN | | OPERATION CODE | | | |
| SENDER MAC ADDRESS (6 BYTES) | | | | | | | |
| SENDER MAC ADDRESS (6 BYTES) | | | | | | | |
| SENDER IP ADDRESS (4 BYTES) | | | | | | | |
| DESTINATION MAC ADDRESS (6 BYTES) | | | | | | | |
| DESTINATION MAC ADDRESS (6 BYTES) | | | | | | | |
| DESTINATION IP ADDRESS (4 BYTES) | | | | | | | |

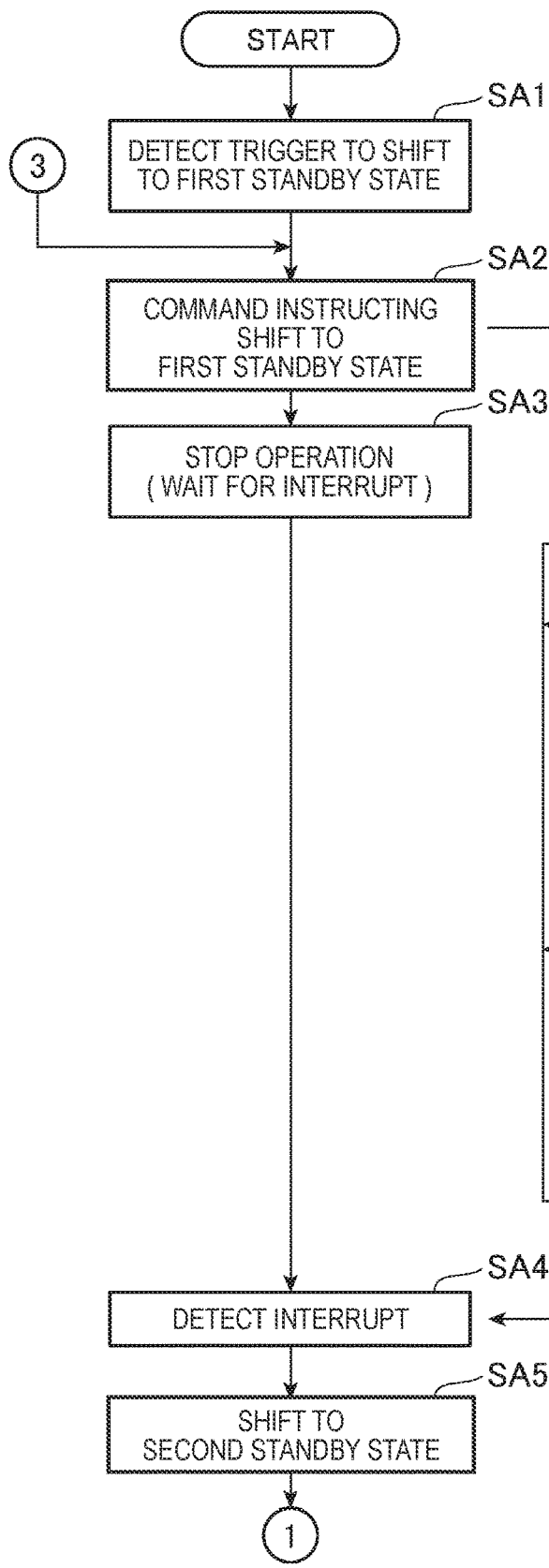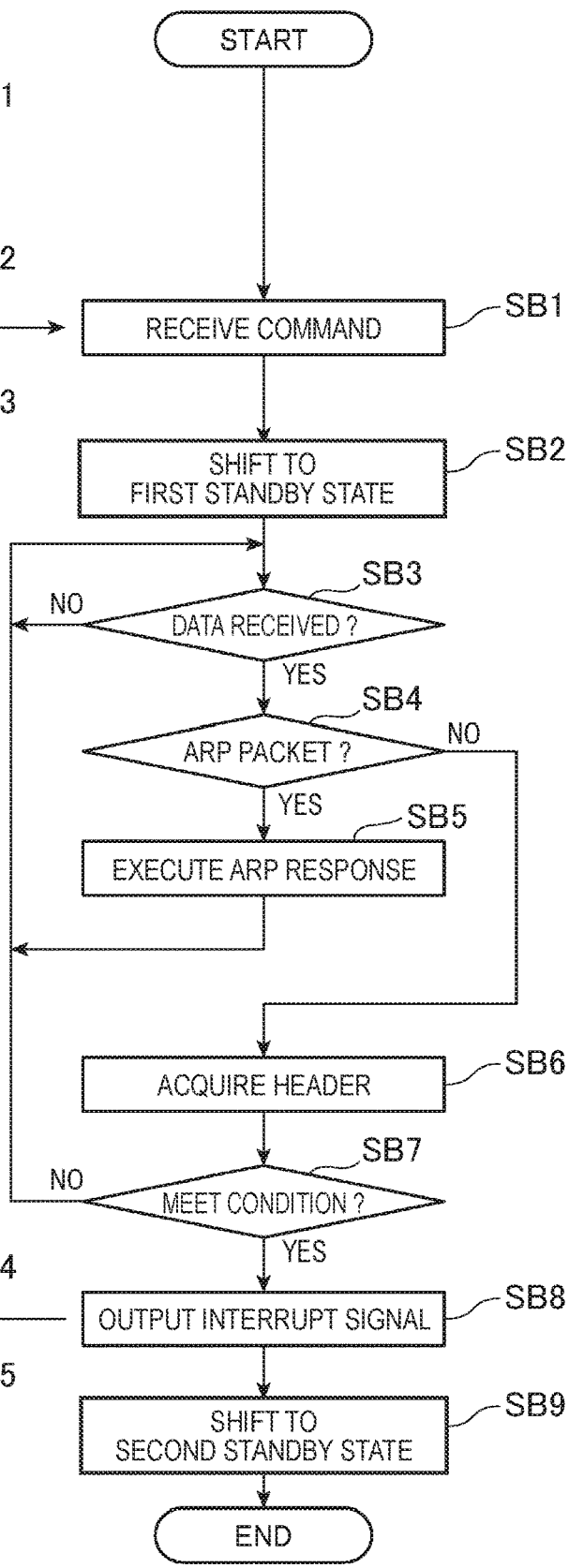

| 0 | 7 | 8 | 15 | 16 | 23 | 24 | 31 |
|---|---|---|---|---|---|---|---|
| SENDER PORT NUMBER (16 BITS) |||| DESTINATION PORT NUMBER (16 BITS) ||||
| SEQUENCE NUMBER (32 BITS) ||||||||
| CONFIRMATION RESPONSE NUMBER (32 BITS) ||||||||
| WINDOW SIZE (16 BITS) |||| CODE BITS | RESERVED || HEADER LENGTH |
| EMERGENCY POINTER (16 BITS) ||||||||
| OPTION ||||||||
| DATA ||||||||

COMMUNICATION DEVICE, DISPLAY DEVICE, AND CONTROL METHOD FOR DISPLAY DEVICE

TECHNICAL FIELD

The present invention relates to a communication device, a display device, and a control method for a display device.

BACKGROUND ART

Traditionally, a technique for reducing power consumption in a standby state of a device with a communication function is proposed (see, for example, PTL 1). The device of PTL 1 includes a main CPU which processes an image signal and also includes a network CPU, a sub-CPU, and a network sub-CPU. In this device, power supplying states such as off, standby state A, standby state B, standby state C, active standby, warm-up, and ON, are prepared. In these power supplying states, power supply to each CPU is controlled, thus achieving power saving. For example, in the standby state A, which is the state where power saving is emphasized most, power is supplied only to the sub-CPU, which detects a power ON instruction. Meanwhile, in the standby state B, which is the state where power saving is emphasized next to the standby state A, power is fed to the network sub-CPU to enable a network communication function only for wired communication. Moreover, in the standby state C, a wireless communication function is enabled. In the standby states B and C, where the network communication function is enabled, wired or wireless data communication can be executed and processing of received data can be carries out. Power supply to the other CPUs is stopped, thus achieving power saving.

CITATION LIST

Patent Literature

PTL 1: JP-A-2013-164833

SUMMARY OF INVENTION

Technical Problem

As in the device described in PTL 1, in the standby states where the network communication function is enabled, the communication function can be maintained and the amount of power consumed can be restrained. However, it is difficult to reduce power consumption necessary to maintain the communication function.

In view of the foregoing problem, an object of the invention is to provide a communication device, a display device, a control method for a display device, and a program that enable execution of a state where communication via a network is possible, with less power consumption.

Solution to Problem

To achieve the foregoing object, according to the invention, a communication device includes: a communication unit which receives control data; and a main control unit which controls an operation of the communication device, based on the control data received by the communication unit. The communication device operates in a first standby state where the main control unit stops at least a part of operations and where the communication unit detects only an access to a specific port that designates the communication device as a destination, and in a second standby state where the main control unit can execute the operations and controls the operation of the communication device, based on the control data. The communication unit wakes up the main control unit if an access to the specific port is detected in the first standby state.

According to the invention, in the first standby state, at least a part of the operations of the main control unit can be stopped to achieve power saving. The main control unit can be started up quickly according to need. Also, in the first standby state, only an access to the specific port that designates the communication device as the destination needs to be detected. Therefore, for example, the communication unit need not be equipped with the function of processing the control data. This limits the functions to be executed by the communication unit in the first standby state, making it possible to restrain the power consumption by the communication unit. The standby state where communication can be executed can be executed with less power consumption.

Also, to achieve the foregoing object, a communication device according to the invention includes: a communication unit which receives control data; and a main control unit which performs control based on the control data received by the communication unit. The communication device executes a first standby state and a second standby state. In the first standby state, the main control unit stops at least a part of operations and the communication unit detects only the control data representing a destination and an access port that are set in advance. In the second standby state, the communication unit receives the control data and the main control unit can execute the operations and performs control based on the control data received by the communication unit. The communication unit wakes up the main control unit and shifts to the second standby state if the control data representing the destination and the access port that are set in advance is detected in the first standby state.

According to the invention, in the first standby state, at least a part of the operations of the main control unit can be stopped to achieve power saving. The main control unit can be started up quickly according to need. Also, in the first standby state, only an access to the specific port that designates the communication device as the destination needs to be detected. Therefore, for example, the communication unit need not be equipped with the function of processing the control data. This limits the functions to be executed by the communication unit in the first standby state, making it possible to restrain the power consumption by the communication unit. The standby state where communication can be executed can be executed with less power consumption.

Also, according to the invention, in the communication device, the communication unit includes a communication interface and a communication control unit which transmits and receives data via the communication interface. The communication control unit, in the first standby state, detects information designating a destination device and information designating a destination port from the data received via the communication interface, and determines whether the detected information corresponds to a preset destination and port or not.

According to the invention, in the first standby state, the communication unit carries out the processing of determining information designating a destination device and information designating a port, on the control data received via the communication interface. This can simplify the processing in the first standby state and restrain power consumption.

Also, according to the invention, in the communication device, the communication control unit detects a network address of the destination device and a port number of the destination from a header of the data received via the communication interface.

According to the invention, the processing in the first standby state can be limited to the processing of determining a network address and a port number, thus achieving further power saving.

Also, according to the invention, in the communication device, the communication control unit transmits data of a response to the received control data via the communication interface if the control data based on an address resolution protocol is received via the communication interface.

According to the invention, a response to the control data based on the address resolution protocol can be provided in the first standby state. Therefore, the state where communication can be made via a network can be maintained without significantly increasing power consumption.

Also, according to the invention, in the communication device, the main control unit and the communication unit shift to the first standby state when a predetermined time has passed after shifting to the second standby state.

According to the invention, shifting from the second standby state, where the main control unit operates, to the first standby state enables efficient reduction of power consumption.

Also, according to the invention, in the communication device, if the communication unit receives the control data from a second external device after detecting an access to the specific port that designates the communication device as the destination from a first external device and shifting to the second standby state, the second standby state is maintained even when the predetermined time has passed after shifting to the second standby state.

According to the invention, after a shift from the first standby state to the second standby state is made, the second standby state is maintained, depending on the circumstance where the control data is received from an external device. Therefore, the number of times of transition between the first standby state and the second standby state is restrained and the processing can thus be made more efficient.

Also, according to the invention, in the communication device, the communication unit, in the first standby state, does not wake up the main control unit with respect to an access that designates a plurality of devices including the communication device as destinations.

According to the invention, for example, when a frame to be broadcast is received or the like, the main control unit is not started up. Therefore, the occasion where the main control unit is started up can be limited to necessary cases and power consumption can be reduced more efficiently.

Also, to achieve the foregoing object, according to the invention, a display device having a display unit which displays an image includes: a communication unit which receives control data; and a main control unit which controls an operation of the display device, based on the control data received by the communication unit. The display device operates in a first standby state where the main control unit stops at least a part of operations and where the communication unit detects only an access to a specific port that designates the display device as a destination, and in a second standby state where the main control unit can execute the operations and controls the operation of the display device, based on the control data. The communication unit wakes up the main control unit if an access to the specific port is detected in the first standby state.

According to the invention, in the first standby state, at least a part of the operations of the main control unit can be stopped to achieve power saving. The main control unit can be started up quickly according to need. Also, in the first standby state, only an access to the specific port that designates the display device as the destination needs to be detected. Therefore, for example, the communication unit need not be equipped with the function of processing the control data. This limits the functions to be executed by the communication unit in the first standby state, making it possible to restrain the power consumption by the communication unit. The standby state where communication can be executed can be executed with less power consumption.

Also, to achieve the foregoing object, a control method for a display device according to the invention includes: controlling a display device having a display unit which displays an image, a communication unit which receives control data, and a main control unit which controls an operation of the display device, based on the control data received by the communication unit; causing the display device to operate in a first standby state where the main control unit stops at least a part of operations and where the communication unit detects only an access to a specific port that designates the display device as a destination, and in a second standby state where the main control unit can execute the operations and controls the operation of the display device, based on the control data; and causing the communication unit to wake up the main control unit if an access to the specific port is detected in the first standby state.

According to the invention, in the first standby state, at least a part of the operations of the main control unit can be stopped to achieve power saving. The main control unit can be started up quickly according to need. Also, in the first standby state, only an access to the specific port that designates the display device as the destination needs to be detected. Therefore, for example, the communication unit need not be equipped with the function of processing the control data. This limits the functions to be executed by the communication unit in the first standby state, making it possible to restrain the power consumption by the communication unit. The standby state where communication can be executed can be executed with less power consumption.

Also, to achieve the foregoing object, according to the invention, a program executable on a computer for a display device having a display unit which displays an image and a communication unit which receives control data is to control an operation of the display device, based on the control data received by the communication unit. The computer stops at least a part of operations in a first standby state where the communication unit detects only an access to a specific port that designates the display device as a destination. If the communication unit detects an access to the specific port and outputs an interrupt in the first standby state, the computer starts up in response to the interrupt and shifts to a second standby state. The computer controls the operation of the display device, based on the control data received by the communication unit in the second standby state. The computer stops at least a part of the operations and shifts to the first standby state when a predetermined time has passed after shifting to the second standby state.

According to the invention, in the first standby state, at least a part of the operations of the computer controlling the operation of the display device can be stopped to achieve power saving. The computer can be started up quickly according to need. Also, in the first standby state, only an access to the specific port that designates the display device as the destination needs to be detected. Therefore, for example, the communication unit need not be equipped with the function of processing the control data. This limits the functions to be executed by the communication unit in the first standby state, making it possible to restrain the power consumption by the communication unit. The standby state where communication can be executed can be executed with less power consumption.

BRIEF DESCRIPTION OF DRAWINGS

FIG. 4 is a schematic view showing the configuration of data transmitted and received by the projector.

FIG. 5 is a schematic view showing the configuration of data transmitted and received by the projector.

FIG. 6 is a flowchart showing the operation of the projector.

FIG. 8 is a schematic view showing the configuration of data transmitted and received by the projector.

DESCRIPTION OF EMBODIMENTS

Figure 1:
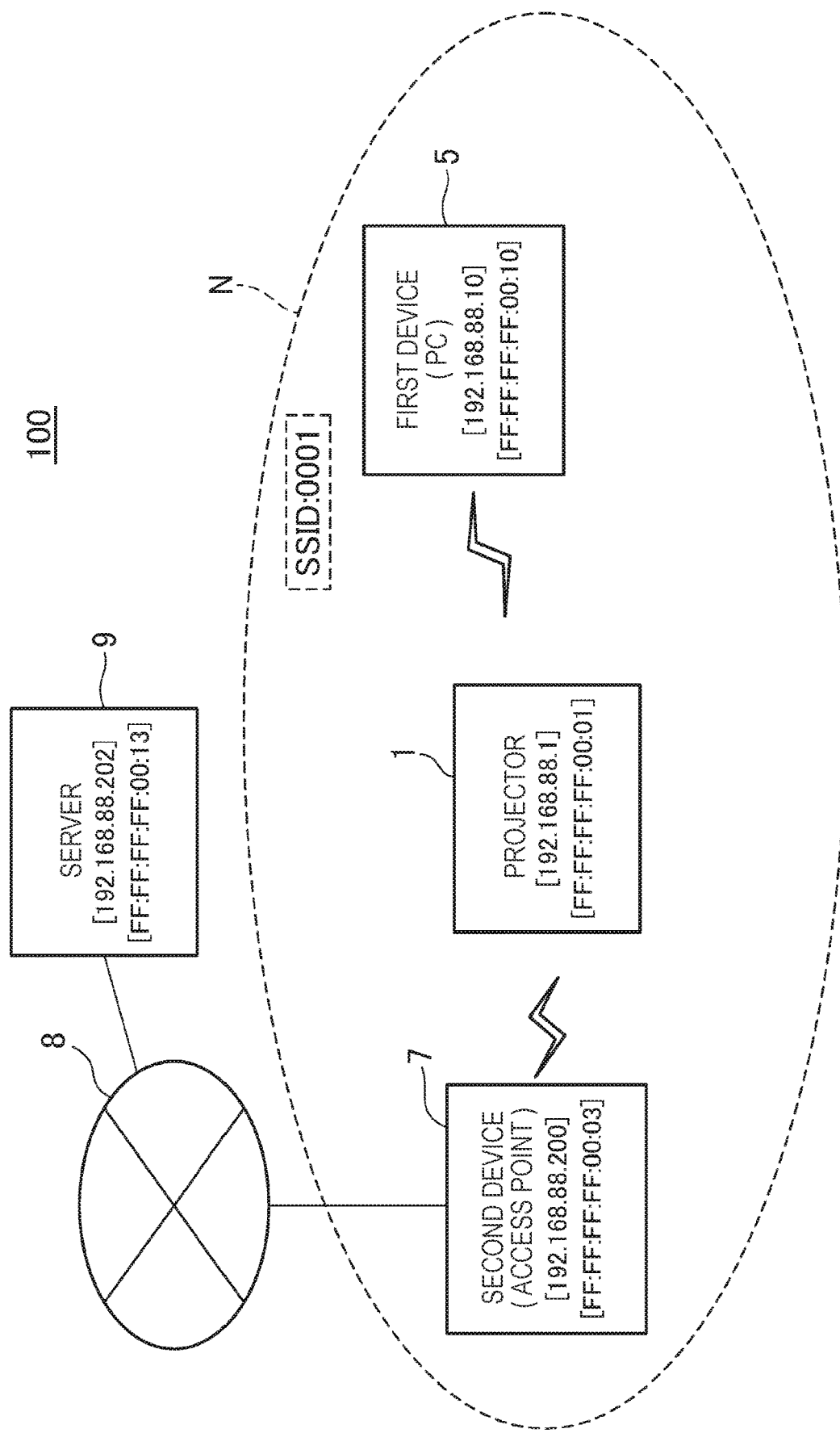
FIG. 1 is a configuration view of a communication system using a projector according to an embodiment.

FIG. 1 is a configuration view of a communication system 100 using a projector 1.

The communication system 100 includes a wireless communication network N which connects the projector 1 in such away that the projector 1 can communicate with a first device 5 and a second device 7. In the wireless communication network N, the projector 1, the first device 5, and the second device 7 transmit and receive data to and from each other. As an example, the wireless communication network N in this embodiment is a wireless LAN prescribed by IEEE 802.11 (including Wi-Fi (trademark registered)), and the SSID of the wireless communication network N is "0001".

The first device 5 functions as an image supply device which supplies image data to the projector 1. The first device 5 may be any device that executes wireless data communication and that can supply image data, and is not limited to any specific form. The image data supplied by the first device 5 may be still image data or dynamic image (video data), may also include audio data, and may have an arbitrary data format or the like. While the first device 5 is described, for example, as a personal computer (PC) in this embodiment, the first device 5 may also be a tablet computer, a mobile phone including a smartphone, or a player or the like which plays back and outputs image data recorded on a recording medium.

Figure 2:
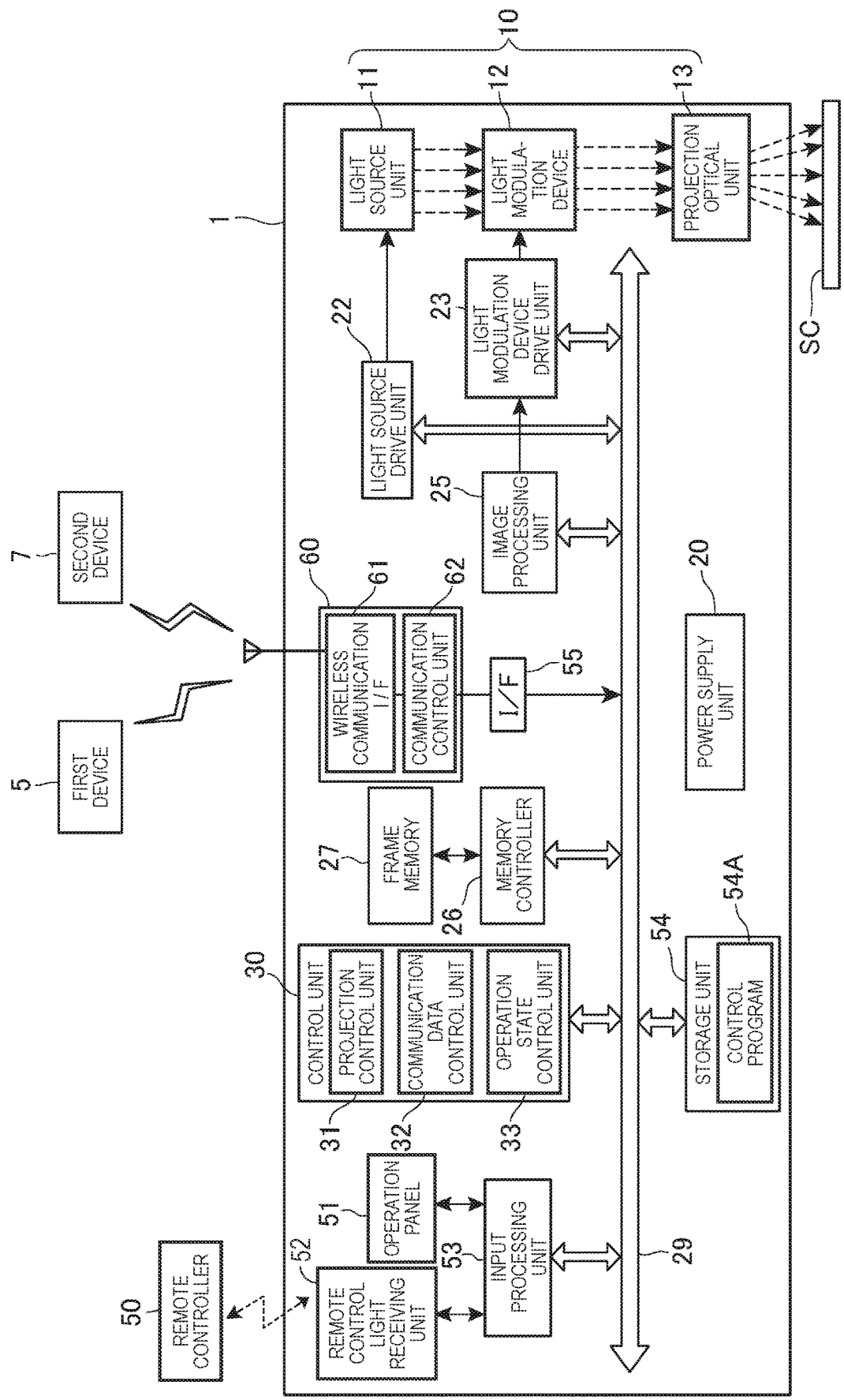
FIG. 2 is a functional block diagram of the projector.

The projector 1 receives the image data transmitted from the first device 5 and projects an image based on the received image data onto a target object such as a screen SC (FIG. 2). Although the target object in this embodiment is a flat screen SC, the target object may be an object that is not uniformly flat, such as a building or object, and may be also be an object having a flat projection surface such as a wall surface of a building.

The second device 7 is a device which executes wireless communication with the projector 1 and the first device 5. The second device 7 may be a personal computer operating as an image supply device, similarly to the first device 5, and may also be a network apparatus such as a router or wireless access point. In this embodiment, the second device 7 is a wireless access point constituting the wireless communication network N and relays the communication between the projector 1 and the first device 5. That is, the wireless communication network N is a network configured by the second device 7 in a wireless LAN (local area network) infrastructure mode. The projector 1, the first device 5, and the second device 7 may communicate by Wi-Fi Direct.

The second device 7 is connected to a network 8 configured by a wired communication network. A server 9 is connected to the network 8. The network 8 is, for example, an Ethernet (trademark registered) network laid inside a building where the wireless communication network N is arranged. The network 8 along with the wireless communication network N constitutes the communication system 100. Multiple devices other than the server 9 may be connected to the network 8, though not illustrated here.

The server 9 is connectable from various devices that can communicate via the network 8. The server 9 may be a file server, web server or the like, and its purpose and function are not limited. In this embodiment, the server 9 functions as a DHCP (dynamic host configuration protocol) server and executes allocation of a dynamic IP address to each device included in the communication system 100.

In the example of FIG. 1, each of the projector 1, the first device 5, and the second device 7 has an IP (internet protocol) address belonging to the same network. The same applies to the server 9. In this embodiment, an example where the projector 1, the first device 5, the second device 7, and the server 9 belong to a private network having a 24-bit network address "192.168.88" is described. In this example, the IP address of the projector 1 is "192.168.88.1". The IP address of the first device 5 is "192.168.88.10". The IP address of the second device 7 is "192.168.88.200". The IP address of the server 9 is "192.168.88.202".

The projector 1, the first device 5, the second device 7, and the server 9 have a MAC (media access control) address that is allocated in advance. As an example, in this embodiment, the MAC address of the projector 1 is "FF:FF:FF:FF:00:01". The MAC address of the first device 5 is "FF:FF:FF:FF:00:10". The MAC address of the second device 7 is "FF:FF:FF:FF:00:03". The MAC address of the server 9 is "FF:FF:FF:FF:00:13". The SSID of the wireless communication network N, and the IP address and MAC address of each device are fictional addresses for the sake of convenience of the description.

FIG. 2 is a functional block diagram of the projector 1.

The projector 1 has a communication unit 60 which executes wireless data communication in the wireless communication network N. The communication unit 60 may be mounted on a board shared by a semiconductor device and circuit constituting the control system of the projector 1. However, in this embodiment, the communication unit 60 is connected to an I/F (interface) 55 including a connector mounted on the board. The communication unit 60 has a wireless communication I/F 61 (communication interface) which has an antenna and which transmits and receives wireless radio waves, and a communication control unit 62 which controls the wireless communication I/F 61.

The projector 1 has a projection unit 10 which forms an optical image and which projects and displays the image, and an image processing system which electrically processes the image displayed by this projection unit 10.

The projection unit 10 has a light source unit 11, a light modulation device 12, and a projection optical unit 13.

The light source unit 11 has a light source made up of a xenon lamp, ultra-high-pressure mercury lamp, LED (light emitting diode) or the like.

The light modulation device 12 has a transmission-type liquid crystal panel in which a plurality of pixels is arranged in the form of matrix, and modulates light emitted from the light source. The light modulation device 12 is driven by a light modulation device drive unit 23 and changes the transmittance of light in each pixel arranged in the form of matrix in the liquid crystal panel, thus forming an image.

The projection optical unit 13 has a zoom lens which enlarges and reduces an image to be protected and which adjusts the focal point thereof, and a focus adjustment mechanism or the like which adjust the focusing. The projection optical unit 13 projects the image light modulated by the light modulation device 12 and thus forms an image on a target object.

A light source drive unit 22 and the light modulation device drive unit 23 are connected to the projection unit 10. The light source drive unit 22 and the light modulation device drive unit 23 are connected to a control unit 30 via a bus 29.

The light source drive unit 22 operates under the control of the control unit 30 and drives the light source provided in the light source unit 11. The light modulation device drive unit 23 operates under the control of the control unit 30, and drives the light modulation device 12, based on an image signal inputted from an image processing unit 25, thus drawing an image on the liquid crystal panel.

The image processing system of the projector 1 is configured mainly of the control unit 30, which controls the projector 1. The image processing system includes the image processing unit 25, a memory controller 26, a frame memory 27, and a storage unit 54. The control unit 30, the storage unit 54, the image processing unit 25, and the memory controller 26 are connected to the bus 29.

The projector 1 also has a power supply unit 20. The power supply unit 20 is connected to an external utility power supply (not illustrated) and supplies electric power to each part of the projector 1, based on AC power supplied from this utility power supply.

The control unit 30 (main control unit) has a SoC 301 (FIG. 3) or the like, described later, and executes various programs, thus controlling the projector 1. The control unit 30 executes a control program 54A stored in the storage unit 54 and thus executes the function of a projection control unit 31 with which the projector 1 projects an image based on image data. The control unit 30 also executes the functions of a communication data control unit 32 which executes processing of data transmitted and received by the communication unit 60 and control of communication by the communication unit 60, and of an operation state control unit 33 which controls the state of power supply to each part of the projector 1.

The projection control unit 31 controls the light source drive unit 22, the light modulation device drive unit 23, and the image processing unit 25 to project an image based on inputted image data, onto a target object. The projection control unit 31 may also control the image processing unit 25 to execute correction processing on the image data.

The image processing unit 25 acquires image data inputted via the communication unit 60 under the control of the control unit 30. With respect to the image data acquired from the communication unit 60, the image processing unit 25 determines the image size, resolution, whether it is a still image or dynamic image, and if it is a dynamic image, an attribute such as frame rate. The image processing unit 25 also loads the acquired image data into the frame memory 27 via the memory controller 26 and executes image processing on the loaded image data. The image processing unit 25 reads out the processed image data from the frame memory 27, generates R, G, B image signals corresponding to the image data thus read out, and outputs the image signals to the light modulation device drive unit 23. The processing executed by the image processing unit 25 is, for example, scaling processing, geometric correction processing, luminance correction processing or the like. The image processing unit 25 may be configured to execute a combination of a plurality of kinds of processing, of the foregoing processing.

The communication data control unit 32 controls processing of data received by the communication unit 60 and data transmission by the communication unit 60. In the communication unit 60, the communication control unit 62 transmits and receives image data or control data via the wireless communication I/F 61. The communication data control unit 32 acquires and analyzes the data received by the communication control unit 62, and if the data is control data, carries out processing according to a command or the like included in the control data. For example, the communication data control unit 32 acquires some setting commands and some parameters included in the control data transmitted from the first device 5 and sets conditions for the projector 1 to project an image. Meanwhile, if the data received by the communication unit 60 is image data, the communication data control unit 32 extracts the image data and outputs the image data to the image processing unit 25.

The operation state control unit 33 sets a plurality of operation states including a standby state for power saving, as the operation state of the projector 1. In this embodiment, the operation state is switched among a first standby state with the least amount of power consumption, a second standby state with the second least amount of power consumption next to the first standby state, and a normal operation state where projection by the projection unit 10 can be carried out.

In the first standby state, each part of the projector including the control unit 30 stops, except for the communication unit 60. In the first standby state, the communication unit 60 is supplied with electric power from the power supply unit 20 and thus can execute wireless communication via the wireless communication network N (FIG. 1). Also, the control unit 30 stops in the first standby state and therefore the communication data control unit 32 cannot control data transmitted and received by the communication unit 60.

Also, in the first standby state, a remote control light receiving unit 52 and an input processing unit 53 may operate and be able to detect an operation on a remote controller 50 and an operation on an operation panel 51.

In this way, the first standby state is a state where the projector waits for reception of data by the communication unit 60 and an operation on the remote controller 50 or the operation panel 51. The first standby state may also be called passive network standby.

In the second standby state, the control unit 30 and the communication unit 60 operate, enabling execution of wireless communication by the communication unit 60 and processing of data by the communication unit 60. In the second standby state, the image processing unit 25, the memory controller 26, and the frame memory 27 may be able to operate. Also, the control unit 30 may be able to access the storage unit 54 and read the control program 54A or write data into the storage unit 54. Also, in the second standby state, the light source drive unit 22, the light modulation device drive unit 23, and the image processing unit 25 may be able to perform processing. In the second standby state, the light source unit 11, the light modulation device 12, and the drive unit of the projection optical unit 13 in the projection unit 10 may be supplied with standby power. However, the lighting of the light source unit 11, the display (driving) of the light modulation device 12, and the operation of the drive unit of the projection optical unit 13 are inactive. In the second standby state, the projector waits for reception of data by the communication unit 60 and an operation on the remote controller 50 or the operation panel 51, and the control unit 30 can carry out data processing. The second standby state may be called active network standby.

The operation state control unit 33 switches the operation state among the first standby state, the second standby state, and the normal operation state. In this switching, the operation state control unit 33 may control the power supply unit 20 to switch the state of power supply to each part from the power supply unit 20. The operation state control unit 33 may also be configured not to control the power supply unit 20. Specifically, the operation state control unit 33 may output a command designating the start and stop of operation to each part constituting the projector 1, and each part of the projector 1 may start or stop the operation in response to this command. In this case, each part of the projector 1 stops in the first standby state and in the second standby state, without the power supply unit 20 switching the state of power supply. The amount of power consumed is thus reduced. When each functional unit of the projector 1 thus stops in the first standby state and in the second standby state, the control unit 30 may stop each functional unit, thus causing the power supply to stop as a result. Alternatively, the power supply unit 20 may stop the power supply to each functional unit under the control of the control unit 30, thus causing each functional unit to stop.

The operation panel 51 having various switches which are operated by the user is located on the main body of the projector 1. The operation panel 51 is connected to the input processing unit 53. The operation panel 51 may have an indicator lamp.

The input processing unit 53 is connected to the control unit 30 via the bus 29. When an operation of a switch on the operation panel 51 is detected, the input processing unit 53 outputs an operation signal corresponding to the switch whose operation is detected, to the control unit 30.

Also, the input processing unit 53, under the control of the control unit 30, turns on or flashes on and off the indicator lamp of the operation panel 51 according to the operation state and setting state of the projector 1.

The projector 1 has the remote controller 50, which is operated by the user. The remote controller 50 is configured as a separate unit from the projector 1. The remote controller 50 has various switches which are operated by the user. The remote controller 50 detects an operation on the switches and transmits an infrared signal. The main body of the projector 1 has the remote control light receiving unit 52, which receives the infrared signal emitted from the remote controller 50. The remote control light receiving unit 52 is connected to the input processing unit 53 and outputs a signal corresponding to the infrared signal received from the remote controller 50, to the input processing unit 53. The input processing unit 53 generates an operation signal indicating the content of an operation on the remote controller 50, based on the signal inputted from the remote control light receiving unit 52, and outputs the operation signal to the control unit 30.

The storage unit 54 is a storage device which stores data and programs in a non-volatile manner, and is configured of a semiconductor memory device such as a flash memory, or a magnetic storage device. The storage unit 54 stores data processed by the control unit 30 and the control program 54A executed by the control unit 30.

Figure 3:
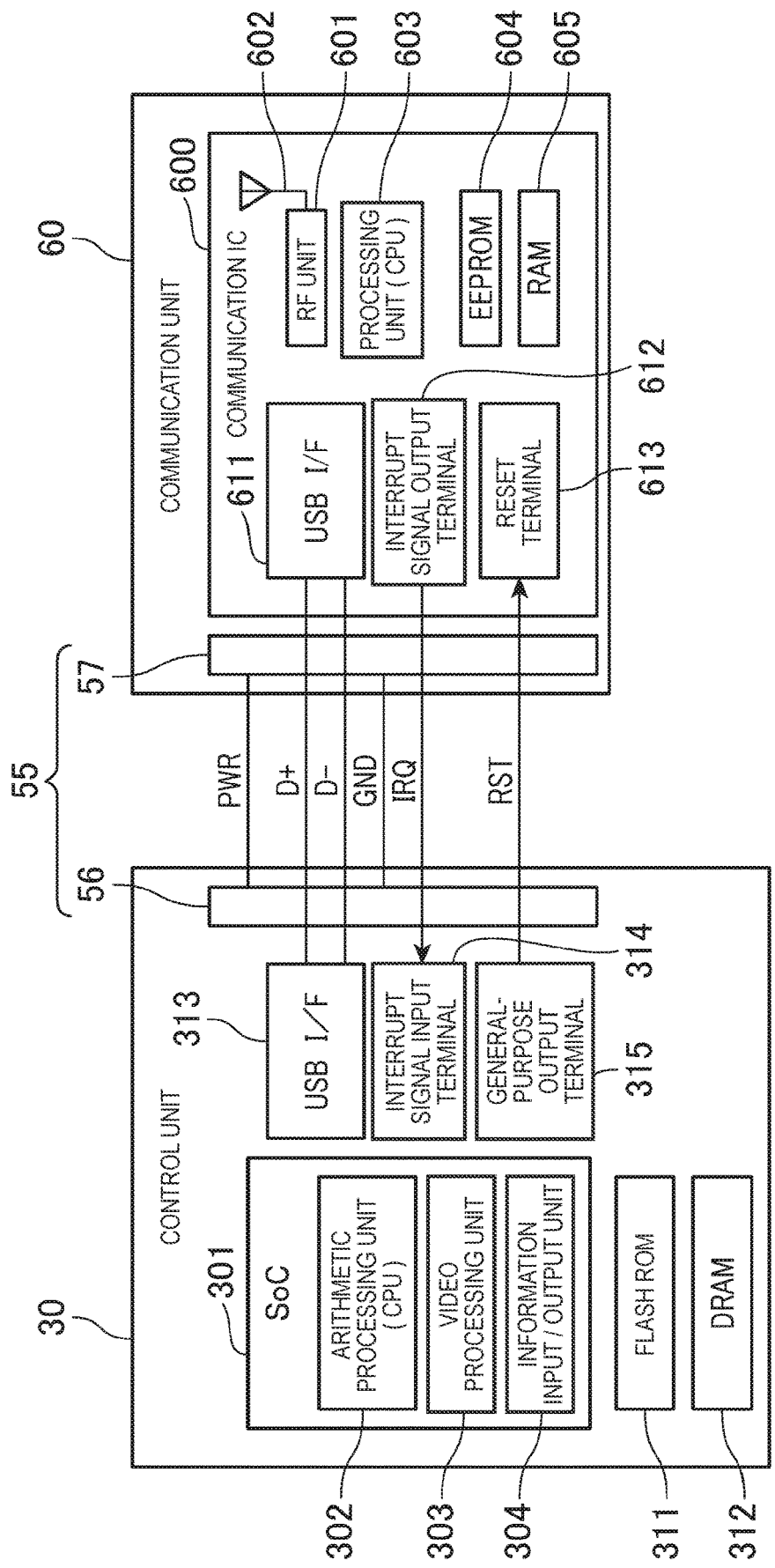
FIG. 3 is a block diagram of a control unit and a communication unit.

FIG. 3 is a block diagram showing the configuration of the control unit 30 and the communication unit 60. FIG. 3 shows an example of the hardware configuration of the control unit 30 and the communication unit 60.

The control unit 30 has a SoC (system on chip) 301. The SoC 301 has an arithmetic processing unit 302, a video processing unit 303, and an information input/output unit 304, and is connected to a flash ROM 311 and a DRAM 312. The arithmetic processing unit 302 is a CPU (central processing unit) and executes a program stored in the flash ROM 311 and the control program 54A (FIG. 2). As the arithmetic processing unit 302 executes the programs, the functions of the projection control unit 31, the communication data control unit 32, and the operation state control unit 33 of FIG. 2 are implemented. The video processing unit 303 is installed, for example, as a DSP (digital signal processor) core for video processing and may function as the image processing unit 25 (FIG. 2) and the memory controller 26 (FIG. 2).

The information input/output unit 304 is a controller which controls input and output of data to and from the SoC 301.

The flash ROM (read-only memory) 311 is a semiconductor memory device which stores programs and data in a non-volatile manner. The DRAM (dynamic random access memory) 312 constitutes a work area for temporarily storing programs executed by the SoC 301 and data of a processing target.

Also, a USB (universal serial bus) interface (I/F) 313, an interrupt signal input terminal 314, and a general-purpose output terminal 315 are connected to the SoC 301. The USB I/F 313, the interrupt signal input terminal 314, and the general-purpose output terminal 315 may be installed inside the SoC 301.

The USB I/F 313 is an interface which executes data communication conforming to the USB standard and which inputs and outputs a D+ signal and a D− signal. An interrupt signal outputted from the communication unit 60 is inputted to the interrupt signal input terminal 314. The control unit 30 detects the interrupt signal to the interrupt signal input terminal 314 and thus can resume operation from the stopped state. The general-purpose output terminal 315 is installed in the SoC 301, as a terminal which outputs various signals generated by the SoC 301. In this embodiment, the general-purpose output terminal 315 is used to output a reset signal.

The communication unit 60 is configured, having a communication IC 600. The communication IC 600 has an RF (radio frequency) unit 601 which transmits and receives wireless radio waves via an antenna 602. The communication IC 600 also has a processing unit 603. The processing unit 603 is a CPU which executes programs. The processing unit 603 loads and executes a program stored in an EEPROM (electrically erasable programmable ROM) 604 and thus functions as a baseband circuit and a MAC circuit. The processing unit 603 carries out generation of data transmitted by the RF unit 601 and processing of data received by the RF unit 601. The EEPROM 604 stores programs executed by the processing unit 603 and data in a non-volatile manner. Also, a RAM (random access memory) 605 constitutes a work area for temporarily storing programs executed by the processing unit 603 and data of a processing target.

The communication IC 600 has a USB I/F 611, an interrupt signal output terminal 612, and a reset terminal 613.

The USB I/F 611 is an interface which executes data communication conforming to the USB standard and which inputs and outputs a D+ signal and a D− signal. The interrupt signal output terminal 612 is a terminal which outputs an interrupt signal generated by the processing unit 603. A reset signal outputted from the general-purpose output terminal 315 of the control unit 30 is inputted to the reset terminal 613.

The version of the USB standard to which the USB I/F 313 and the USB I/F 611 conform is not particularly limited and may be one of USB 1.0, USB 1.1, USB 2.0, USB 3.0, and USB 3.1 or may be one of the subsequent standards thereof. The USB I/F 313 and the USB I/F 611 in this embodiment support communication using a 4-pin connector corresponding to data input/output terminals made up of a power supply terminal, a ground terminal, and D+ and D− terminals.

In the configuration example of FIG. 3, the I/F 55 connecting the control unit 30 and the communication unit 60 includes a connector 56 provided in the control unit 30 and a connector 57 provided in the communication unit 60. The connector 56 and the connector 57 are connected to each other via a power line PWR, a data line D+, a data line D−, and a ground line GND. The connector 56 and the connector 57 also connect an interrupt signal line IRQ and a reset signal line RST.

The power line PWR, the data line D+, the data line D−, and the ground line GND correspond to the 4 pins of the USB standard. The power line PWR supplies electric power prescribed by the USB standard from the connector 56 to the connector 57. The ground line GND grounds the ground terminal of the connector 57. The data line D+ and the data line D− transmit a differential signal in conformity with the USB standard.

The interrupt signal line IRQ connects the interrupt signal output terminal 612 and the interrupt signal input terminal 314. The reset signal line RST connects the general-purpose output terminal 315 and the reset terminal 613.

The I/F 55 shown in FIG. 3 has specifications to connect the power line PWR, the data line D+, the data line D−, and the ground line GND conforming to the USB standard, and also to connect the interrupt signal line IRQ for transmitting an interrupt signal and the reset signal line RST for transmitting a reset signal.

In the configuration of FIG. 3, the USB I/F 313 of the control unit 30 and the USB I/F 611 of the communication unit 60 are connected to each other via the data lines D+, D−, the power line PWR, and the ground line GND. Therefore, data can be transmitted and received between the control unit 30 and the communication unit 60. In the second standby state and in the normal operation state, the control unit 30 controls the communication unit 60, outputs data to be transmitted wirelessly, to the communication unit 60, and acquires data received by the communication unit 60.

In this configuration, an interrupt signal can be outputted from the communication unit 60 to the control unit 30 via the interrupt signal line IRQ. When an interrupt signal is inputted to the interrupt signal input terminal 314 in the first standby state, the SoC 301 starts up, loads a program stored in the flash ROM 311, and shifts to the second standby state. Also, the SoC 301 in the second standby state shifts the projector 1 to the normal operation state where projection by the projection unit 10 is possible, according to control data or the like inputted from the communication unit 60.

Also, when shifting from the first standby state to the second standby state, the SoC 301 outputs a reset signal from the general-purpose output terminal 315 via the reset signal line RST. This reset signal is inputted to the reset terminal 613.

The communication IC 600 resets the operation, triggered by the reset signal being inputted to the reset terminal 613. In this case, the communication IC 600 clears the RAM 605, and the processing unit 603 loads a program stored in the EEPROM 604 and restarts.

In the first standby state, in the communication IC 600, the RF unit 601 receives data from outside via the antenna 602. The processing unit 603 determines whether the address of the destination and the port of the destination, of the data received by the RF unit 601, meet set conditions or not. Then, if the destination of the received data is the projector 1 and the port of the destination is a preset port, the processing unit 603 generates an interrupt signal and outputs the interrupt signal from the interrupt signal output terminal 612 to the interrupt signal input terminal 314.

FIG. 4 is a schematic view showing the configuration data transmitted and received by the projector 1. FIG. 4(A) shows the frame configuration of IEEE 802.11 formulated by the IEEE (The Institute of Electrical and Electronics Engineers). FIG. 4(B) is a view showing details of the configuration of the IEEE 802.11 header of FIG. 4(A).

The frame format of wireless LAN data transmitted and received by the projector 1 in this embodiment includes a physical header and a MAC frame, as shown in FIG. 4(A). The physical header includes a PLCP preamble and a PLCP header. The PLCP preamble is a bit string of a synchronizing signal added to the beginning of the IEEE 802.11 frame. The PLCP header includes information such as modulation method (transmission speed) and data length.

The "IEEE 802.11 header" of the IEEE 802.11 frame of FIG. 4(A) has seven item fields, as shown in FIG. 4(B). It should be noted that the length of each field in the configuration example of FIG. 4(B) is only an example conforming to the IEEE 802.11 standard.

The IEEE 802.11 header includes "Frame Control", "Duration/ID", "Addresses 1 to 4", and "Sequence Control". The Frame Control field includes information such as frame type, destination (recipient) of the frame, whether the sender is wireless or wired, fragment information, and electric power management. The Duration/ID field includes information such as a scheduled period to use radio waves (time necessary for frame transmission). The Sequence Control field includes information such as a sequence number provided for data to be transmitted, or a fragment number if data is fragmented.

The Addresses 1 to 4 include information such as the MAC address of the destination (recipient), the MAC address of the sender, and the MAC address (BSSID) of the access point. For example, in a frame transmitted from the first device 5 to the projector 1 in the communication system 100, the Address 1 includes the MAC address of the projector 1, and the Address 2 includes the MAC address of the first device 5. Also, the Address 3 includes the SSID of the wireless communication network N.

If the second device 7 relays and transmits a frame transmitted from the server 9, to the projector 1, the Address 1 of this frame includes the MAC address of the projector 1. The Address 2 includes the SSID of the wireless communication network N. The Address 3 includes the MAC address of the server 9. Also, the MAC address of the second device 7 may be stored in one of the Address fields.

In this way, referring to the Address fields included in the IEEE 802.11 header of the IEEE 802.11 frame, the destination and sender or the like of the frame can be specified.

FIG. 5 is a schematic view showing the configuration of data transmitted and received by the projector 1. Specifically, FIG. 5 shows the configuration of the DATA field of FIG. 4(A). FIG. 5(A) shows a configuration example in the case where a UDP (user datagram protocol) packet is used. FIG. 5(B) shows an example of an ARP (address resolution protocol) packet.

The UDP is used in the case of transmitting a large volume of data while maintaining immediacy, such as the case of streaming image data (including video data) and audio data. In this case, the DATA field includes a sender port number, destination port number, message length, checksum, and data, as shown in FIG. 5(A). The data length may be arbitrary. Also, the number of bits in each field shown in FIG. 5(A) is an example.

As shown in FIG. 5(A), the beginning of the UDP packet includes information designating the port numbers of the sender and destination (recipient). Therefore, the port numbers can be specified, based on the data of a predetermined number of bits (in FIG. 5(A), 32 bits) at the beginning of the UDP packet.

As described above, in the first standby state, the processing unit 603 detects data in which the network address of the destination is the address of the projector 1 and in which the port number of the destination is a preset port number, from the data received by the RF unit 601. Here, the network address may be a MAC address or an IP address and may enable the projector 1 to be identified in the communication system 100 or the wireless communication network N.

The set port number is set, for example, in the communication system 100, as a port number to restore the projector 1 from the first standby state. In the examples shown in FIGS. 4 and 5, the address of the destination is stored, for example, in the Address field of FIG. 4(B), and the port number is included in the UDP header, as shown in FIG. 5(A). Therefore, the processing unit 603 may determine whether the Address field of the IEEE 802.11 header of the data received by the RF unit 601 and the beginning (UDP header) of the UDP packet include the designated address and port number or not. Thus, the processing unit 603 may store in the RAM 605 at least the Address field of the IEEE 802.11 header and the beginning (UDP header) of the UDP packet and then carry out the foregoing processing. Therefore, the capacity of the RAM 605 may be smaller than the entirety of the UDP packet.

It is preferable that the "preset predetermined port number" determined by the processing unit 603 is a different number from a port number known in the UDP or TCP/IP (transmission control protocol/internet protocol). For example, a port number included in the port 0-1023, known as a well-known port, and the port 1024-49151, known as a registered port number, may be used as the "preset predetermined port number" determined by the processing unit 603. In this case, data including the "preset predetermined port number" as the port of the destination can be transmitted to the projector 1 from an existing device such as a PC. This is advantageous in that control data can be transmitted to the projector 1, using an existing facility, thus easily implementing the invention. In this case, one of the registered port numbers included in the range of 1024-49151 may be used as the "preset predetermined port number". Also, a port number that is new to the range may be applied to an organization which manages port numbers, and the "preset predetermined port number" may thus be secured. Of course, a number outside the range can be employed. Also, the communication system 100 may be configured to carry out communication under a protocol other than the UDP or TCP/IP.

The communication IC 600 may store one or a smaller number of port numbers that are set, for example, into the EEPROM 604.

The processing unit 603 also has the function of responding to an ARP packet if the ARP packet is received by the RF unit 601 in the first standby state. FIG. 5(B) shows the configuration of the ARP packet in the case where the network medium is the Ethernet.

A hardware type field in the ARP packet includes a value expressing the type of the physical medium on the network. A protocol field includes information representing the type (TCP/IP, UDP or the like) of a higher protocol handled in the ARP. An HLEN (hardware address length) field includes information representing the length of the MAC address. A PLEN (protocol address length) field includes information representing the length of address information used on the higher protocol.

An operation code field includes a code expressing the type of an operation of the ARP. In an operation using the ARP, first, the device which transmits an ARP request (for example, the server 9) transmits an ARP packet, and the destination device (for example, the projector 1) sends back an ARP response. The operation code field includes a code discriminating whether the packet is a request or a response thereto.

In addition, the ARP packet includes the MAC addresses and IP addresses of the sender and the destination.

To maintain communication in the communication system 100, ARP packets are transmitted and received between the respective devices constituting the communication system 100. For example, in order to confirm whether the projector 1 exists or not, the server 9 and the second device 7 managing the communication system 100 transmit an ARP packet to each device including the projector 1. Also, for example, when the server 9 operates as a DHCP server, an ARP packet is transmitted from the server 9 to the projector 1 in order to secure the validity of the IP address allocated (leased) to the projector 1. If the projector 1 transmits a response ARP packet to these ARP packets, the state where the projector 1 can communicate in the communication system 100 is maintained. On the other hand, if the projector 1 receives an ARP packet from another device requesting a response and does not response to this ARP packet, the communication with the projector 1 may become disconnected.

The projector 1 in this embodiment has the function of responding to an ARP packet and transmitting a response ARP packet even in the first standby state. Moreover, since the processing unit 603 can execute the function of transmitting a response ARP packet, an ARP packet can be processed without waking up the SoC 301 when the SoC 301 is inactive.

When the ARP packet shown in FIG. 5(B) is received, the processing unit 603 generates a response packet. The response packet may be generated using data stored in advance in the EEPROM 604 or may be generated using data included in each field of the received ARP packet.

Figure 7:
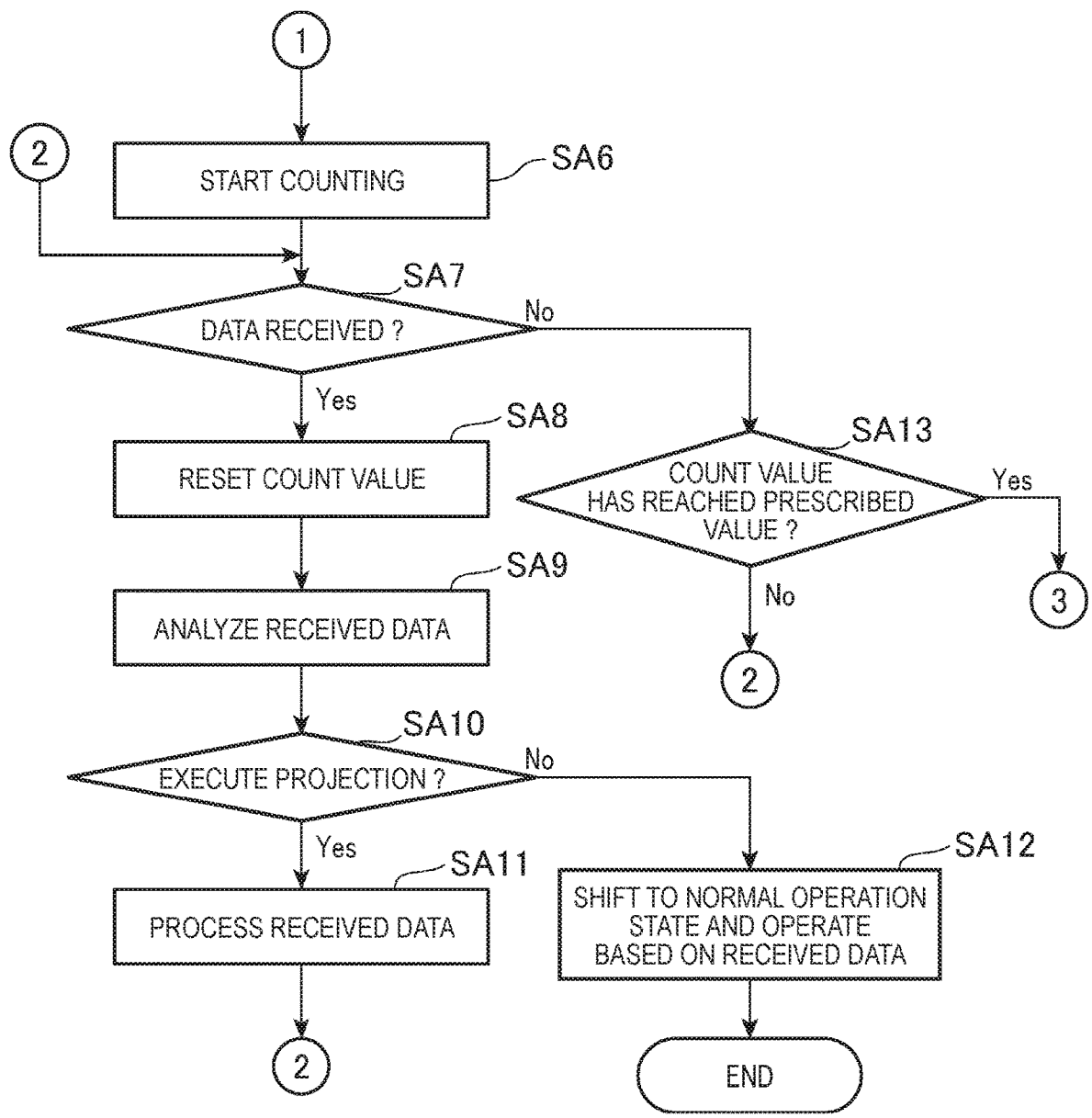
FIG. 7 is a flowchart showing the operation of the projector.

FIGS. 6 and 7 are flowcharts showing the operation of the projector 1. FIG. 6(A) shows the operation of the control unit 30. FIG. 6(B) shows the operation of the communication unit 60. FIG. 7 shows the operation continuing from FIG. 6(A).

FIGS. 6 and 7 show the operation in the normal operation state or the second standby state of the projector 1. The operation state control unit 33 (FIG. 2) detects a trigger to shift to the first standby state (step SA1) and then outputs a command designating a shift to the first standby state to each unit including the communication unit 60 (step SA2).

The trigger to shift to the first standby state may be an operation on the remote controller 50 or the operation panel 51, or control data transmitted to the projector 1 from another device via the wireless communication network N.

For example, the control unit 30 determines whether the control data received by the communication unit 60 is a command designating a shift to the first standby state or not. If the control data is this command, the operation state control unit 33 detects a trigger to shift to the first standby state. In this case, it is possible to shift the projector 1 to the first standby state, by transmitting the control data to the projector 1 via the wireless communication network N or the network 8. In this case, for example, the control data may be transmitted to each of a plurality of projectors including the projector 1 located at various sites in a building. This can cause a transition from the second standby state to the first standby state via remote control. Therefore, in a system which manages the operation states of multiple projectors 1, the projectors 1 can be shifted from the first standby state to the second standby state and vice versa. This can reduce the burden of managing the projectors 1. Also, the invention can be easily applied to a system which manages a plurality of projectors.

Also, the trigger to shift to the first standby state may be a manual operation. For example, when an instruction of a "power-saving mode", "standby mode" or "passive standby" is inputted by an operation on the remote controller 50 or the operation panel 51, the operation state control unit 33 detects this operation as a trigger to shift to the first standby state.

Moreover, if the state where the remote controller 50 or the operation panel 51 is not operated continues in the second standby state and the duration of such a state reaches a threshold, the operation state control unit 33 may detect this as a trigger to shift to the first standby state.

The operation state control unit 33 stops operating after it finish transmission of the command, and shifts to a state waiting for input of an interrupt signal (step SA3). By this procedure, the control unit 30 stops operating, and the projector 1 shifts to the first standby state.

The communication control unit 62 of the communication unit 60 receives the command from the control unit 30 (step SB1) and shifts to the first standby state (step SB2).

Subsequently, the communication control unit 62 detects reception of data via the wireless communication I/F 61 (step SB3). The communication control unit 62 keeps waiting for receiving data via the wireless communication I/F 61 (No in step SB3). When the communication control unit 62 receives data (Yes in step SB3), it determines whether the received data is an ARP packet or not (step SB4). More specifically, the communication control unit 62 may determine whether the received data is an ARP packet requesting a response or not.

If the received data is equivalent to an ARP packet (Yes in step SB4), the communication control unit 62 responds to the ARP packet (step SB5) and returns to step SB3. In step SB5, a response ARP packet is generated and transmitted via the wireless communication I/F 61.

If the received data is not an ARP packet (No in step SB4), the communication control unit 62 acquires the header of the received data (step SB6). For example, the communication control unit 62 acquires a field including the address of the destination and the destination port number, or the header including the field including the address of the destination and the destination port number. The acquired header or the data of the field extracted from the header is temporarily stored, for example, into the RAM 605 (FIG. 3).

The communication control unit 62 determines whether the information included in the header acquired in step SB6 meets a condition or not (step SB7). If the information does not meet the condition (No in step SB7), the communication control unit 62 returns to step SB3.

Also, if the information included in the header acquired in step SB6 meets the condition (Yes in step SB7), the communication control unit 62 generates an interrupt signal and outputs the interrupt signal to the control unit 30 (step SB8).

Subsequently, the communication control unit 62 shifts to the second standby state. In the second standby state, the communication control unit 62 transmits the data inputted from the control unit 30, via the wireless communication I/F 61, and outputs the data received via the wireless communication I/F 61, to the control unit 30.

Meanwhile, the control unit 30 detects that the interrupt signal is inputted from the communication unit 60 via the interrupt signal line IRQ (step SA4), then starts up from the stopped state, and shifts to the second standby state (step SA5).

Here, when the control unit 30 starts up, the control unit 30 may output a reset signal to the communication unit 60. The communication unit 60 may be reset, based on this reset signal, and may shift to the second standby state.

The operation state control unit 33 starts counting the time elapsed after the shift to the second standby state (step SA6).

The operation state control unit 33 determines whether the communication unit 60 receives data and the received data is inputted from the communication unit 60 to the control unit 30 or not (step SA7). If data is received (Yes in step SA7), the operation state control unit 33 resets the count value (step SA8) and analyzes the received data (step SA9).

Based on the result of analyzing the data, the operation state control unit 33 determines whether to execute projection by the projection unit 10 or not (step SA10). For example, if the data analyzed in step SA9 is image data or video data for projection, or a command designating the start of projection, the operation state control unit 33 determines that projection is to be started. Meanwhile, if the data analyzed in step SA9 is an ARP packet or the like, projection is not started.

If the operation state control unit 33 determines that projection is not to be started (No in step SA10), the operation state control unit 33 processes the received data and returns to step SA7.

If the operation state control unit 33 determines that projection is to be started (Yes in step SA10), the operation state control unit 33 shifts to the normal operation state and shifts to the state where projection by the projection unit 10 is possible (step SA12).

Meanwhile, if it is determined in step SA7 that data is not received (No in step SA7), the operation state control unit 33 determines whether the count value of the elapsed time has reached a prescribed value or not (step SA13). If the count value has not reached the prescribed value (No in step SA13), the operation state control unit 33 returns to step SA7.

If the count value has reached the prescribed value (Yes in step SA13), the operation state control unit 33 shifts to step SA2 (FIG. 6) in order to shift to the first standby state.

In the operation shown in FIGS. 6 and 7, the communication control unit 62 may discard the data that is determined as not being an ARP packet (No in step SB4) and that is determined as not meeting the condition (No in step SB7), of the data received via the wireless communication I/F 61.

Also, the communication data control unit 32 may determine and destroy data to be broadcast, as not meeting the condition, even if the data includes the address of the projector 1 as the destination address. Packets to be broadcast come in a large number. Therefore, shifting the projector 1 to the second standby state every time a packet to be broadcast is received may increase the amount of power consumed. Thus, with a configuration in which the projector does not shift to the second standby state even when data to be broadcast is received, a reduction in the amount of power consumed can be achieved more efficiently.

Also, as described with reference to FIG. 6(B), the communication control unit 62 is configured not to output to the control unit 30 the content of data received previously in the first standby state, if the communication control unit outputs an interrupt signal to the control unit 30. Therefore, the data which is received in step SB3 and whose header is analyzed in step SB7, serving as a trigger to shift the projector 1 to the second standby state, is not processed by the control unit 30. That is, the first data received by the communication unit 60 in the first standby state is used only for the transition of the standby state of the projector 1 and is not analyzed and processed by the control unit 30. Therefore, it is preferable that there is no problem even if this data is not analyzed and processed by the control unit 30. For example, the first device 5, the second device 7, or the server 9 generates and transmits a UDP packet having a predetermined port number as the destination port number, as control data to switch the projector 1 from the first standby state to another operation state. This enables the projector 1 to shift securely to the second standby state and avoid unnecessary packet transmission.

Also, the projector 1 is not limited to the operation shown in FIGS. 6 and 7 and may have another method that enables the projector 1 to shift from the first standby state to the second standby state. For example, the communication control unit 62 may have a timekeeping function and thus may output an interrupt signal to the control unit 30 when a set time has come, thus shifting to the second standby state. That is, a configuration that enables a transition from the first standby state to the second standby state at a designated time with a timer function may be employed.

As described above, the projector 1 in this embodiment has the communication unit 60, which receives control data, and the control unit 30, which controls the operation of the projector 1, based on the control data received by the communication unit 60. The projector 1 operates in the first standby state, where the control unit 30 stops at least a part of operations and where the communication unit 60 detects only an access to a specific port which designates the projector 1 as the destination. The operation stopped by the control unit 30 may be a communication operation to control the communication unit 60, a projection control to control the projection unit 10, an analysis of data received by the communication unit 60, or the like. Also, an operation other than these may be stopped, and a plurality of operations may be stopped. In a typical example, detection of an operation on the remote controller 50 and the operation panel 51 via the remote control light receiving unit 52 and the input processing unit 53, and detection of an interrupt signal from the communication unit 60 are enabled and the other operations are stopped. The projector also operates in the second standby state, where the control unit 30 can execute at least a part of the foregoing operations stopped in the first standby state and controls the operation of the projector 1, based on the control data. The communication unit 60 wakes up the control unit 30 if an access to the specific port is detected in the first standby state.

With the configuration of the projector 1 as a communication device and as a display device, and the display device control method executed by the projector 1, the control unit 30 can be stopped to achieve power saving in the first standby state, and the control unit 30 can be started up quickly according to need. Also, in the first standby state, only an access to the specific port that designates the projector 1 as the destination needs to be detected. Therefore, for example, the communication unit 60 need not be equipped with the function of processing the control data. This limits the functions to be executed by the communication unit 60 in the first standby state, making it possible to restrain the power consumption by the communication unit 60. The standby state where communication is executable can be executed with less power consumption.

Also, the projector 1 having the communication unit 60 and the control unit 30, which performs control based on control data received by the communication unit 60, executes the first standby state and the second standby state. In the first standby state, the control unit 30 stops the operation and the communication unit 60 detects only the control data representing a destination and an access port that are set in advance. In the second standby state, the communication unit 60 receives the control data and the control unit 30 performs control based on the control data received by the communication unit 60. The communication unit 60 wakes up the control unit 30 and shifts to the second standby state if the control data representing the destination and the access port that are set in advance is detected in the first standby state.

With this configuration of the projector 1 as a communication device and as a display device, and the display device control method executed by the projector 1, in the first standby state, the control unit 30 can be stopped to achieve power saving, and the control unit 30 can be started up quickly according to need. Also, in the first standby state, only an access to the specific port that designates the projector 1 as the destination needs to be detected. Therefore, for example, the communication unit 60 need not be equipped with the function of processing the control data. This limits the functions to be executed by the communication unit 60 in the first standby state, making it possible to restrain the power consumption by the communication unit 60. The standby state where communication is executable can be executed with less power consumption.

With this configuration, the communication control unit 62 may determine the destination and the accessed port, of the data received via the wireless communication I/F 61. That is, the processing to be executed by the processing unit 603 in the first standby state is light-load and simple processing such as partial collation or determination of data. Therefore, the hardware requirement of the communication IC 600 to realize the invention is not high, leading to low risk of increase in costs and high possibility of realization.

Also, the communication unit 60 has the wireless communication I/F 61 and the communication control unit 62, which transmits and receives data via the wireless communication I/F 61. The communication control unit 62, in the first standby state, detects information designating a destination device and information designating a destination port from the data received via the wireless communication I/F 61, and determines whether the detected information corresponds to a preset destination and port or not. In this case, in the first standby state, the communication unit 60 determines information designating a destination device and information designating a port, on the control data received via the wireless communication I/F 61. This can simplify the processing in the first standby state and restrain power consumption.

Also, the communication control unit 62 may detect a network address of the destination device and a port number of the destination from a header of the data received via the wireless communication I/F 61. In this case, the processing in the first standby state can be limited to the processing of determining a network address and a port number, thus achieving further power saving.

Also, the communication control unit 62 transmits data of a response to the received control data via the wireless communication I/F 61 if the control data based on an address resolution protocol (ARP) is received via the wireless communication I/F 61. Therefore, a response to the control data based on the address resolution protocol can be provided in the first standby state and thus the state where communication can be made via the wireless communication network N can be maintained without significantly increasing power consumption.

Also, the control unit 30 and the communication unit 60 may shift to the first standby state when a predetermined time has passed after shifting to the second standby state. For example, a shift to the first standby state can be made if the count value counted by the control unit 30 reaches a prescribed value. In this case, shifting from the second standby state, where the control unit 30 operates, to the first standby state enables efficient reduction of power consumption.

Also, if the projector 1 receives data transmitted from a first external device and shifts from the first standby state to the second standby state, the projector 1 may change the condition to return to the first standby state when data is received from a second external device. The first external device and the second external device may be any of the first device 5, the second device 7, and the server 9.

For example, a case is considered where data transmitted from the server 9 to the projector 1 as the destination is received in the first standby state, thus causing a shift to the second standby state. Subsequently, in the second standby state, when data transmitted from the first device 5 is received, the operation state control unit 33 may maintain the second standby state without shifting to the first standby state even if the count value reaches the prescribed value. Specifically, when data transmitted from the first device 5 is received, the operation state control unit 33 may reset the count value. In this case, by limiting the shift to the first standby state in preparation for the occurrence of communication with the first device 5, it is possible to avoid frequent transitions to the standby state of the projector 1 and efficiently achieve a reduction in the amount of power consumed. Also, if the communication between the first device 5 and the projector 1 continues, delays in the processing can be prevented by restraining transitions of the standby state.

Also, the communication control unit 62 of the projector 1 may be configured not to analyze the sender device or address of the data received in the first standby state. After shifting to the second standby state, the control unit 30 may process the sender address or the like of the data received by the communication unit 60, according to need.

Also, the communication unit 60 may be configured not to wake up the control unit 30 with respect to an access that designates a plurality of devices including the projector 1 as the destinations, in the first standby state. For example, the communication unit 60 may be configured not to shift to the second standby state even when data to be broadcast is received. In this case, the occasion where the control unit 30 is started up can be limited to necessary cases and power consumption can be reduced more efficiently.

The foregoing embodiment is simply an example of specific form to which the invention is applied. The embodiment should not limit the invention. The invention can also be applied to different forms from the embodiment.

For example, in the embodiment, a configuration in which, when the communication unit 60 receives a UDP packet, a destination port number included in the UDP header is acquired and determined, is described as an example. However, the communication unit 60 can be configured to be able to support TCP/IP.

FIG. 8 is a schematic view showing the configuration of data transmitted and received by the projector 1, and specifically, an example of the configuration of a TCP/IP packet.

In the first standby state, the communication unit 60 may be able to be equipped with a TCP/IP handshake, in order for the communication unit 60 to transmit and receive a TCP/IP packet in the state where the control unit 30 is stopped. Specifically, a capacity to be able to store a TCP/IP-loaded program and data may be secured in the EEPROM 604, and the processing unit 603 may be able to execute the program. It is preferable that this program includes procedures for establishing TCP/IP connection and disconnection.

As shown in FIG. 8, the TCP/IP packet includes the destination port number in the leading 32 bits. When executing TCP/IP, the communication control unit 62 may similarly extract a part of the header of the data received via the wireless communication I/F 61, store the part in the RAM 605, and analyze the part, in step SB6. Also, the destination address can be acquired from the header of the IEEE 802.11 frame including the TCP/IP packet.

In this way, the protocol with which the projector 1 executed communication and which can be executed in the first standby state is not limited to UDP, TCP/IP or the like.

Also, in the embodiment, an example in which the control unit 30 shifts to the second standby state when an interrupt signal is inputted to the control unit 30 from the communication unit 60 in the first standby state is described. In addition, the control unit 30 may shift from the first standby state to the normal operation state, where projection by the projection unit 10 is possible.

For example, a configuration in which a discrimination signal in addition to an interrupt signal is outputted to the control unit 30 from the communication unit 60 may be employed. In this case, the discrimination signal is inputted to the interrupt signal input terminal 314 or an input terminal other than the interrupt signal input terminal 314, of the SoC 301, from the output terminal of the communication IC 600.

The communication unit 60 can switch the voltage value of the discrimination signal between a first voltage (+0 V) indicating logical "0" and a second voltage (+3.3 V, +1.8 V or the like) indicating logical "1". The first voltage and the second voltage may be regarded as "low" level and "high" level.

When an interrupt signal at the interrupt signal input terminal 314 is detected, the control unit 30 starts up in different modes, depending on whether the voltage of the discrimination signal at the time of detection is the first voltage (logical "0") or the second voltage (logical "1").

That is, when an interrupt signal is detected in the state where the discrimination signal is logical "0", the control unit 30 shifts from the first standby state to the second standby state. Meanwhile, when an interrupt signal is detected in the state where the discrimination signal is logical "1", the control unit 30 shifts from the first standby state to the normal operation state. In this example, the communication unit 60 can switch the logical value of the discrimination signal, thus causing the control unit 30 to shift from the first standby state to an arbitrary state.

As a condition for the communication unit 60 to switch the logical value of the discrimination signal, the destination port of the control data received in the first standby state can be used.

As described above, the communication unit 60, in the first standby state, can determine a destination port, referring to the header of a UDP packet or the like received from the wireless communication network N. Here, the communication unit 60 can be configured to be able to collate the destination port of the received control data with a plurality of preset ports. For example, 6 ports n1 to n6 are set in advance. (1) The ports n1, n2, n3 are set to correspond to logical "0" of the discrimination signal. (2) The ports n4, n5, n6 are set to correspond to logical "1" of the discrimination signal. The communication unit 60 sets the logical value of the discrimination signal to "0" if the destination port of the received control data corresponds to one of the ports n1, n2, n3. Meanwhile, the communication unit 60 sets the logical value of the discrimination signal to "1" if the destination port of the received control data corresponds to one of the ports n4, n5, n6.

In this example, if the first device 5 or the server 9 transmits to the projector 1 control data including n3 as the destination port when the projector 1 is in the first standby state, the projector 1 can be shifted to the second standby state. Meanwhile, if the first device 5 or the server 9 transmits to the projector 1 control data including n5 as the destination port, the projector 1 can be shifted from the first standby state to the normal operation state.

In an application of this example, an operation state to which the projector shifts from the first standby state can be designated if a device other than the projector 1 that can communicate with the projector 1, such as the first device 5 or the server 9, properly selects a port number with which to access the projector 1. Therefore, the projector 1 can be shifted to the second standby state. Also, the projector 1 can be brought into a state where projection is possible. This can quickly start the projection of an image.

Also, the embodiment is described, using the I/F 55 configured in the form of an extended USB interface, as an example, as shown in FIG. 3. The invention is not limited to this. The control unit 30 and the communication unit 60 may be connected together via a general-purpose interface.

Figure 9:
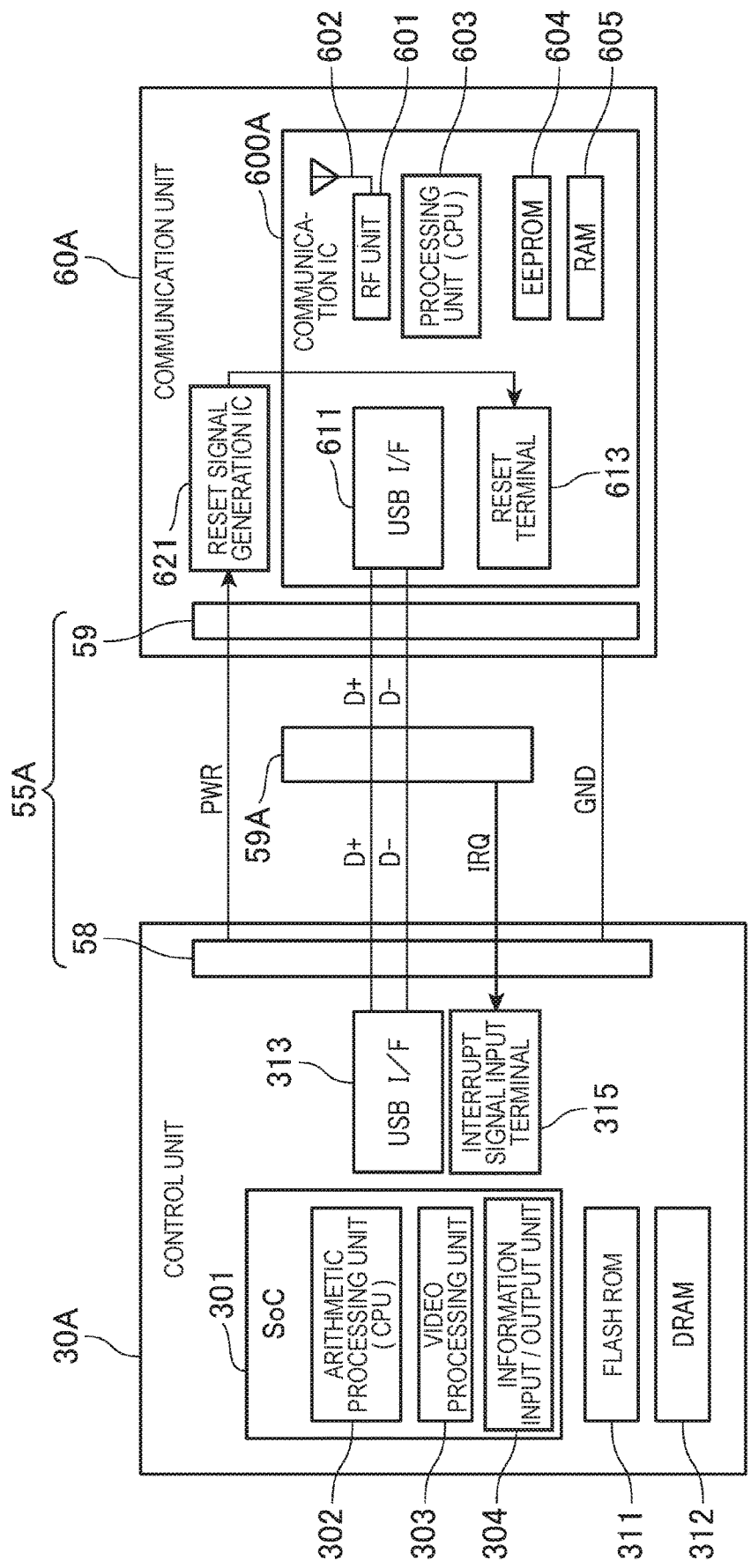
FIG. 9 is a block diagram of a control unit and a communication unit in a modification example.

FIG. 9 shows a configuration having an I/F 55A conforming to the USB standard which is a general-purpose interface, instead of the I/F 55, as a modification example of the projector 1.

In a control unit 30A (main control unit) of FIG. 9, the configurations of the SoC 301, the flash ROM 311, and the DRAM 312 are the same as in the control unit 30 (FIG. 3). Also, the control unit 30A has the USB I/F 313 and the interrupt signal input terminal 314 for the SoC 301.

Also, a control unit 60A has a communication IC 600A instead of the communication IC 600. The communication IC 600A has the RF unit 601, the processing unit 603, the EEPROM 604, and the RAM 605 provided in the communication IC 600. The communication IC 600A also has the USB I/F 611 and the reset terminal 613. The communication IC 600A does not use the interrupt signal output terminal 612. Also, a reset signal generation IC 621 is connected to the reset terminal 613.

In this configuration of FIG. 9, the control unit 30A has a connector 58 instead of the connector 56 (FIG. 3), and the control unit 60A has a connector 59 instead of the connector (FIG. 3). The connector 59 is a 4-pin connector corresponding to a USB interface and connects to a data line D+, a data line D−, a power line PWR, and a ground line GND.

Meanwhile, the connector 58 connects to a data line D+, a data line D−, the power line PWR, and the ground line GND. Also, the I/F 55A has a switch 59A. The switch 59A connects to the connector 58 via the data line D+, the data line D−, and an interrupt signal line IRQ.

In the configuration of FIG. 9, the USB I/F 611 and the USB I/F 313 execute communication via the data line D+ and the data line D−. Also, power supply is provided via the power line PWR and the ground line GND.

Also, the switch 59A is a switch connecting the data line D− of the USB I/F 611 to the interrupt signal input terminal 314 of the control unit 30A. That is, the switch 59A switches and connects the data line D− of the USB I/F 611 to one of the data line D− of the USB I/F 313 and the interrupt signal input terminal 314.

In the first standby state, the switch 59A is on. Therefore, if the USB I/F 611 outputs a signal to the data line D−, this signal is inputted to the interrupt signal input terminal 314 as an interrupt signal.

Meanwhile, in the second standby state and in the normal operation state, the switch 59A is off. The data lines D+, D− of the USB I/F 611 are connected to the data lines D+, D− of the USB I/F 313. Thus, data communication can be carried out.

In this way, the invention can be implemented, using the connector 59 having not terminal to output an interrupt signal.

Although the switch 59A may connect the data line D− of the USB I/F 611 to the data line D− of the USB I/F 313 and the interrupt signal input terminal 314, it is more preferable that the switch 59A connects also to the data line D+ as shown in FIG. 9 in order to keep the balance of a differential signal.

Also, in the example of FIG. 9, if the output voltage on the power line PWR changes, the reset signal generation IC 621 generates a reset signal and outputs the reset signal to the reset terminal 613. Therefore, when the control unit 30A shifts from the first standby state (stopped state) to the second standby state, a reset signal is provided to the control unit 60A. Thus, the control unit 60A can be reset and shifted to the second standby state.

In this example of FIG. 9, a configuration in which a discrimination signal in addition to an interrupt signal is outputted from the control unit 60A to the control unit 30A, as described above, can be employed. In the configuration of FIG. 9, the connector 59 is used, which is a general-purpose USB connector. Therefore, the control unit 60A can use a signal on the data line D+ outputted from the USB I/F 611 can be used as a discrimination signal. The logical value of the discrimination signal can be switched, based on the voltage value on the data line D+ when the signal on the data line D− is inputted to the control unit 30A as an interrupt signal by the switch 59A.

Thus, in the configuration of FIG. 9, the operation state to which the projector 1 shifts from the first standby state is not limited to the second standby state and can also be the normal operation state. The operation state to which the projector shifts can be designated by a port number with which a device other than the projector that can communicate with the projector 1, such as the first device 5 or the server 9, accesses the projector 1, as described above. Therefore, the projector 1 can be shifted to the second standby state. Moreover, the projector 1 can be brought into a state where projection is possible. This can quickly start the projection of an image.

Also, in the embodiment, the projector 1 projecting an image on the screen SC is described as an example of the display device. The invention is not limited to this and may be a liquid crystal monitor or liquid crystal television, or a monitor device or television receiver which displays an image on a PDP (plasma display panel). Also, the invention may be applied to various display devices including a self-emitting display device such as a monitor device or television receiver which displays an image on an organic EL display panel. In this case, the liquid crystal display panel, the plasma display panel, and the organic EL display panel are equivalent to the display unit.

Also, in the configuration of the projector 1, the light modulation device is not limited to a configuration using three transmission-type liquid crystal panels. A configuration using a reflection-type liquid crystal panel, a digital mirror device (DMD), or a color wheel or the like may be employed.

Moreover, the communication device of the invention is not limited to the projector 1 and may be a device having a configuration that enables communication. While the communication unit 60, 60A communicating via a wireless LAN is described as an example in the embodiment, the invention can also be applied to a device which communicates via a wired LAN (for example, Ethernet). In this case, the processing of extracting, acquiring, and determining the destination MAC address from the header of the Ethernet frame may be carried out instead of the processing of extracting, acquiring, and determining the IEEE 802.11 header of the IEEE 802.11 frame. Also, the specific form of the communication circuit, the specifications of the connectors, the type of the protocol executed or the like can be changed arbitrarily.

Moreover, the communication device of the invention may be any device which executes communication. For example, the invention may be applied to a personal computer, or a communication module built in a printer, scanner, or various other devices.

The functions units shown in the respective illustrations of FIGS. 2, 3 and 9 represent functional configurations of the projector 1, and the specific installation forms of these are not particularly limited. That is, hardware corresponding to each of the functional units need not necessarily be installed. Of course, it is possible to employ a configuration in which one processor executes a program to realize the functions of a plurality of functional units. Also, a part of the functions realized by software in the embodiment may be realized by hardware. Alternatively, a part of the functions realized by hardware may be realized by software. Also, the control unit 30, 30A and the communication unit 60, 60A may use an ASIC (application specific integrated circuit). Also, a PLD (programmable logic device) such as FPGA (field-programmable gate array) may be configured by programming. These units may also be implemented as a circuit including a plurality of semiconductor devices. If hardware executes a program to realize the foregoing functions, this program may be stored in a storage device other than the storage unit provided in the projector 1.

REFERENCE SIGNS LIST

1 . . . projector (display device, communication device), 5 . . . first device (external device), 7 . . . second device (external device), 8 . . . network, 9 . . . server (external device), 10 . . . projection unit, 11 . . . light source unit, 12 . . . light modulation device, 13 . . . projection optical unit, 20 . . . power supply unit, 22 . . . light source drive unit, 23 . . . light modulation device drive unit, 25 . . . image processing unit, 26 . . . memory controller, 27 . . . frame memory, 29 . . . bus, 30, 30A . . . control unit (main control unit), 31 . . . projection control unit, 32 . . . communication data control unit, 33 . . . operation state control unit, 50 . . . remote controller, 51 . . . operation panel, 52 . . . remote control light receiving unit, 53 . . . input processing unit, 54 . . . storage unit, 54A . . . control program, 55, 55A . . . I/F, 59A . . . switch, 60, 60A . . . communication unit, 61 . . . wireless communication I/F (communication interface), 62 . . . communication control unit, 100 . . . communication system, 301 . . . SoC, 302 . . . arithmetic processing unit, 303 . . . video processing unit, 304 . . . information input/output unit, 313 . . . USB I/F, 314 . . . interrupt signal input terminal, 315 . . . general-purpose output terminal, 600, 600A . . . communication IC, 601 . . . RF unit, 602 . . . antenna, 603 . . . processing unit, 605 . . . RAM, 611 . . . USB I/F, 612 . . . interrupt signal output terminal, 613 . . . reset terminal, 621 reset signal generation IC, D+ . . . data line, D− . . . data line, GND . . . ground line, IRQ . . . interrupt signal line, N . . . wireless communication network, PWR . . . power line, RST . . . reset signal line, SC . . . screen.

The invention claimed is:

1. A communication device comprising:
a first processor programmed to receive control data; and
a second processor programmed to control an operation of the communication device, based on the control data received by the first processor,
wherein the communication device operates in a first standby state where the second processor is programmed to stop at least a part of operations and where access detected by the first processor is limited to detection of an access to a specific port that designates the communication device as a destination, without detection of an access that designates a plurality of devices including the communication device as destinations, and in a second standby state where the second processor can execute the operations and controls the operation of the communication device, based on the control data, and
the first processor wakes up the second processor if an access to the specific port is detected in the first standby state.

2. The communication device according to claim 1, further comprising:
a communication interface,
wherein the first processor is programmed to transmit and receive data via the communication interface, and
in the first standby state, the first processor is programmed to detect the access by detecting information designating a destination device and information designating a destination port from the data received via the communication interface, and determine whether the detected information corresponds to a preset destination and port or not.

3. The communication device according to claim 2, wherein the first processor programmed to detect the information designating the destination device by detecting a network address of the destination device and detects the information designating the destination port by detecting a port number of the destination from a header of the data received via the communication interface.

4. The communication device according to claim 2, wherein if control data based on an address resolution protocol is received via the communication interface, the first processor programmed to transmit data of a response to the received control data via the communication interface.

5. The communication device according to claim 1, wherein the second processor and the first processor shift to the first standby state when a predetermined time has passed after shifting to the second standby state.

6. The communication device according to claim 5, wherein if the first processor receives the control data from a second external device after detecting an access to the specific port that designates the communication device as the destination from a first external device and shifting to the second standby state, the second standby state is maintained even when the predetermined time has passed after shifting to the second standby state.

7. The communication device according to claim 1, wherein the first processor, in the first standby state, does not wake up the second processor with respect to the access that designates a plurality of devices including the communication device as destinations.

8. A display device having a display which displays an image, the display device comprising:

first processor programmed to receive control data; and second processor programmed to control an operation of the display device, based on the control data received by the first processor, wherein the display device operates in a first standby state where the is programmed to stop at least a part of operations and where access detected by the first processor is limited to detection of an access to a specific port that designates the display device as a destination, without detection of an access that designates a plurality of devices including the communication device as destinations, and in a second standby state where the second processor can execute the operations and controls the operation of the display device, based on the control data, and the first processor wakes up the second processor if an access to the specific port is detected in the first standby state.

9. A control method for a display device, the method comprising:

controlling a display device having a display which displays an image, a first processor programmed to receive control data, and a second processor programmed to control an operation of the display device, based on the control data received by the first processor;

causing the display device to operate in a first standby state where the second processor is programmed to stop at least a part of operations and where access detected by the first processor is limited to detection of an access to a specific port that designates the display device as a destination, without detection of an access that designates a plurality of devices including the communication device as destinations, and in a second standby state where the second processor can execute the operations and controls the operation of the display device, based on the control data; and causing the first processor to wake up the second processor if an access to the specific port is detected in the first standby state.

* * * * *